United States Patent Office 3,343,565
Patented Sept. 26, 1967

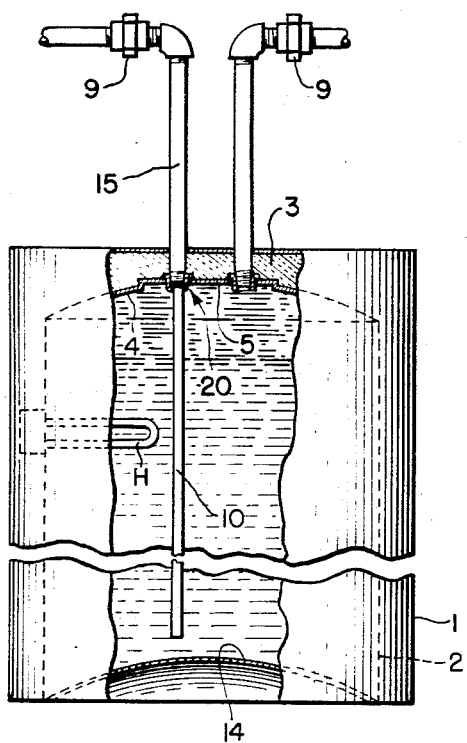
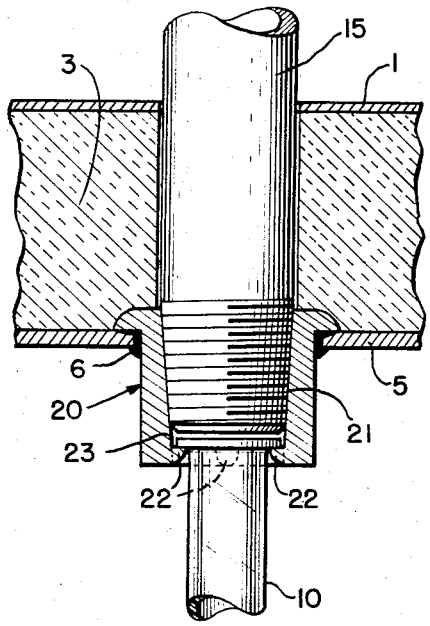
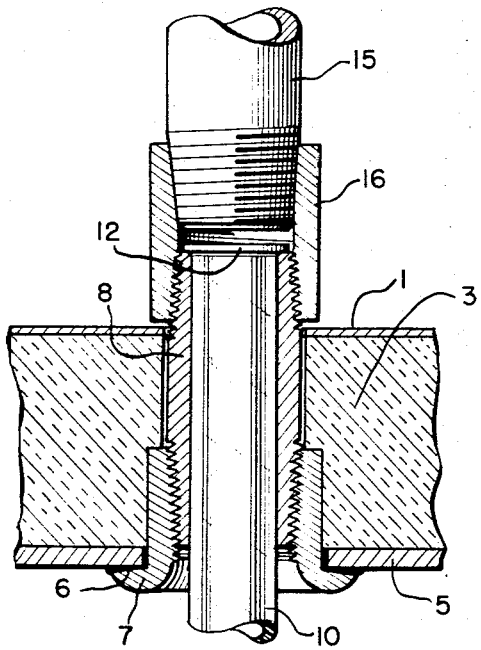
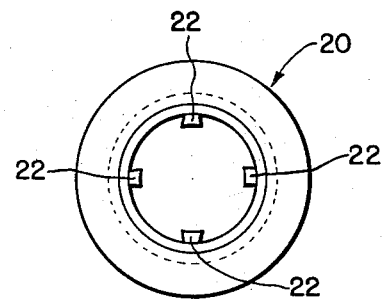

3,343,565
DOMESTIC APPLIANCE
Harry L. Johnson, Milwaukee, Wis., assignor to General
Electric Company, a corporation of New York
Filed Dec. 20, 1963, Ser. No. 332,169
2 Claims. (Cl. 137—592)

This invention relates to water heaters and, more particularly, to a water inlet structure for water heaters.

Many water heaters presently manufactured are made with the hot water outlet and the cold water inlet both provided in the upper end of the water storage tank. To prevent mixing of the cold water introduced into the tank with the hot water to be removed from the tank, it is a common practice to provide a plastic dip tube or diffuser tube as a part of the water inlet structure. The plastic dip tube extends from the water inlet downwardly to the lower portion of the storage tank and discharges the cold water in that area, thereby avoiding intermingling with the hot water in the upper portion of the tank.

In prior art water heaters, including those made by my assignee herein, a threaded spud or fitting constituting the cold water inlet tapping of the water heater tank is fitted with a short length of pipe which extends upwardly through the insulation and terminates at the appearance casing or jacket of the heater. The plastic dip tube passes through this pipe and is supported thereon by means of a flange which rests upon the upper edge of the pipe. To complete the connection to the cold water service piping, the plumber must use a coupling or union. This latter fitting also serves to retain the dip tube in position. Although it is usually necessary to use a ground-joint union at some point in completing the connection of the water heater to the cold water service piping, it may be disadvantageous to place the union so close to the top of the water heater cabinet, and the plumber may decide to use a simple pipe coupling at that point, even though it adds an additional threaded joint to the piping system.

The present invention uses a single inlet spud as the cold water pipe connection at the tank, and also as the dip tube support means. This latter facility results from forming the inner end of the spud (considered with respect to its installation in the heater tank) with a plurality of upset ledges upon which the flanged end of the tube may rest. Actually, these ledges are within the tank itself and the length of the dip tube is therefore several inches less than the dip tubes used in the former arrangement. The cold water service piping is screwed directly into the inlet spud. The relationship of the supporting ledges to the internal threading of the inlet spud is preferably such that when the cold water service pipe is screwed into the spud the end of the pipe closely overlies the flange of the dip tube but does not exert any pressure thereon. Because of this relationship it is not necessary to carefully form the upset shoulders or to employ any manufacturing operations calculated to smooth the tube supporting surfaces of the shoulders or to insure that they occupy a precise plane, for there is no opportunity for the service pipe to exert a distorting pressure on the flange. In fact, the tube may be said to "float" within the spud.

An object of this invention, therefore, is to provide an improved water inlet structure for a water heater.

Another object of this invention is to provide a water heater which is more economical to manufacture, and more adaptable to various installation conditions.

Other features and advantages of the invention will best be understood by the following detailed description of a presently preferred embodiment thereof read in connection with the accompanying drawing in which:

FIG. 1 is a fragmentary elevation, partly in section, showing a water heater having hot and cold water service piping, the dip tube being mounted pursuant to the present invention;

FIG. 2 is a fragmentary sectional elevation showing the previously described conventional method of mounting the dip tube;

FIG. 3 is a view similar to FIG. 2 but showing in detail the dip tube mounting arrangement embodying the present invention; and FIG. 4 is a top plan view of the cold water inlet spud showing the disposition of the dip tube supporting projections.

FIG. 1 illustrates a water heater incorporating a water inlet structure in accordance with a preferred embodiment of the invention. The heater includes an outer appearance casing 1 which encloses a water tank 2, the space between the casing 1 and tank 2 being filled with thermal insulation 3. Said insulation ordinarily comprises batts of glass fiber. The top wall 4 of the tank is embossed to provide a flat area 5, having openings such as opening 6, FIG. 2, to accommodate a cold water inlet structure and a hot water outlet structure respectively. The top of the casing 1 is provided with registering openings. One or more heating elements H and appropriate controls are used for water heating, it being understood, however, that the invention is applicable to any type of water heater regardless of whether the heating medium is electricity, gas, or oil.

Referring first to FIG. 2, which shows the cold water inlet system prior to the present invention, the cold water inlet opening 6 of the tank has welded thereto an inverted spud 7 having appropriate internal threading. This spud screw-threadedly receives the pipe or nipple 8 provided by the manufacturer; at most, said nipple is barely long enough to pass through the jacket 1 sufficiently to present an adequate male threaded end for connection to service piping. The dip tube 10 has a flanged end 12 which rests on the upper edge of the nipple 8; said tube extends through the nipple to terminate three or four inches above the bottom head 14 (FIG. 1) of the tank. In order to connect the water heater to the cold water service piping 15 of the installation, it is, of course, necessary to employ a suitable connection fitting between the piping and the nipple 8. It is best, of course, for a ground-joint union to be used, but the plumber may find it undesirable to locate a ground-joint union such as the union 9, FIG. 1, in such close proximity to the water heater casing. Therefore, the plumber frequently uses a simple pipe coupling 16 to complete the connection between the nipple and the service pipe, and places the union at a more advantageous location, as suggested in FIG. 1. To the installer, it appears to be a matter of indifference that the coupling will add another threaded joint to the piping system, although each joint is a potential failure area. The extent of internal threading of couplings or unions differs from manufacturer to manufacturer and may even differ among similar fittings of the same manufacturer. Therefore, the space between the end of the service piping 15 and the flange 12 of the dip tube may vary quite materially. In some installations the flange might be tightly confined and in others there may be a considerable space between the flange and the end of the service pipe. It is most desirable to reduce such space to a minimum to prevent the dip tube from vibrating or becoming displaced during the inflow of cold water into the water heater tank.

FIGS. 3 and 4 illustrate in detail the water inlet structure embodying the present invention, and reference is also made to FIG. 1. The spud 20 extends through the opening 6 in the tank head flat area 5, and is securely attached thereto by some conventional means such as welding. The spud 20 is appropriately threaded as indicated at 21, FIG. 3, to directly receive the end of the cold water service pipe 15. The lower end of the spud is upset or otherwise deformed to include a number of inwardly extending, generally horizontal, projections 22. The threaded portion 21 may be separated from the projections 22 by a smooth wall section 23.

The plastic dip tube 10 is inserted through the spud 20 and extends downwardly to the lower portion of the hot water heater storage tank 2. The outwardly extending flange 12 rests on the projections 22 to support the dip tube in the spud. It is well known that standard pipe threading does not occupy a cylindrical surface throughout its length, but has a slight inward taper; and that the innermost threading is rather blunt. There is, therefore, no difficulty in inserting the tube 10 even though the flange 12 has only slight clearance relative to the wall section 23. Leakage of cold water into the hot water at the top of the tank is minimal because of the small clearances between the tube and spud.

As illustrated in FIGS. 1 and 3, the cold water supply pipe 15 is securely screwed into the spud 20. The threading 21 is of such length and extent that what has been identified as the "smooth wall section" 23—but may in fact be the shape given by the very blunt configuration of the lead thread in the tapping tool (not shown)—is of slightly longer axial length than the thickness of the flange 12 of the dip tube. Therefore, when the water supply pipe 15 is received to its maximum extent by the spud 20, the lower end of the pipe closely overlies the upper edge of the dip tube 10. The term "closely overlies" includes both the situation in which the end of the pipe 15 and the flange 12 are closely adjacent without touching and the situation in which the end of the pipe 15 touches the flange 12 without exerting any appreciable pressure on the flange. Since the dip tube normally is made from a relatively brittle plastic any appreciable compressive force with which the end of the pipe 15 pressed the flange of the dip tube against the projections 22 could cause the supporting flange to crack. This could lead to increasing leakage of cold water into the hot water at the top of the tank, and eventually to separation of the tube from its flange, with consequent loss of the utility of the water heater.

If desired, an internally extending projection could be formed in the lower end of threaded portion 21 or the threads at the lower end of the threaded portion could be burred in order to assure that the water supply pipe 15 will not come into pressure contact with the dip tube 10.

It will be understood that the fibrous material conventionally used for water heater insulation may be easily separated by means of a screwdriver or wrench handle inserted through the openings in the outer casing, and that the plumber may easily thread the cold and hot water pipe connections into the respective spuds. The cost advantages of the present invention are quite apparent; the cost of a nipple at the cold water inlet and hot water outlet connections can be saved, and the dip tube itself is less costly. In mass production items such as water heaters, savings of a fraction of a cent per heater are important to the manufacturer. Obviously, a similar spud 20 may be used at the hot water outlet, for the projections 22 offer minimal obstruction to the flow of water, and the penetration of the spud into the water content of the tank insures that the entrance to the hot water outlet spud will at all times be submerged. The use of identical spuds at the inlet and outlet connections minimizes inventory problems and simplifies manufacturing practices.

Modifications of this invention will occur to those skilled in the art and it is desired to be understood, therefore, that this invention is not to be limited to the particular arrangement disclosed, but that the appended claims are meant to cover all modifications which are within the spirit and scope of this invention.

What I claim as new and desire to secure by Letters Patent of the United States is:

1. An inlet structure for a water heater comprising:
   (a) a spud secured in the top wall of the water tank,
      (1) said spud having a passage therethrough,
      (2) the upper portion of said spud adjacent said passage being threaded to receive a water supply pipe,
      (3) support means formed in the lower portion of said spud and extending into said passage in spaced relationship with said threaded portion,
   (b) a dip tube received in said passage and extending downwardly into said tank to deliver water to the lower portion thereof,
      (1) the upper end of said dip tube including an integral flange which rests on said support means and terminates in close proximity to said threaded portion, the thickness of said flange being related to the spacing between said support means and said threaded portion that a water supply pipe threadedly engaged in said threaded portion of said spud will closely overlie said dip tube without exerting substantial compressive effort against the said flange.

2. An inlet structure as in claim 1 wherein said support means includes a plurality of spaced projections.

References Cited
UNITED STATES PATENTS

| | | | |
|---|---|---|---|
| 1,888,338 | 11/1932 | Weatherhead | 285—158 |
| 2,445,578 | 7/1948 | Howe | 285—158 |
| 2,602,463 | 7/1952 | Stroop | 258—140 |
| 2,764,427 | 9/1956 | Andrus | 285—140 |
| 2,842,163 | 7/1958 | Boylan | 285—140 |

M. CARY NELSON, *Primary Examiner.*

W. CLINE, *Assistant Examiner.*